Feb. 24, 1948.　　　A. A. JOHNSON　　　2,436,752
WINCH FOR TOWING AND THE LIKE
Filed Feb. 17, 1945　　　2 Sheets-Sheet 1

INVENTOR.
Almon A. Johnson.
BY
ATTORNEY.

Feb. 24, 1948.  A. A. JOHNSON  2,436,752
WINCH FOR TOWING AND THE LIKE
Filed Feb. 17, 1945  2 Sheets-Sheet 2
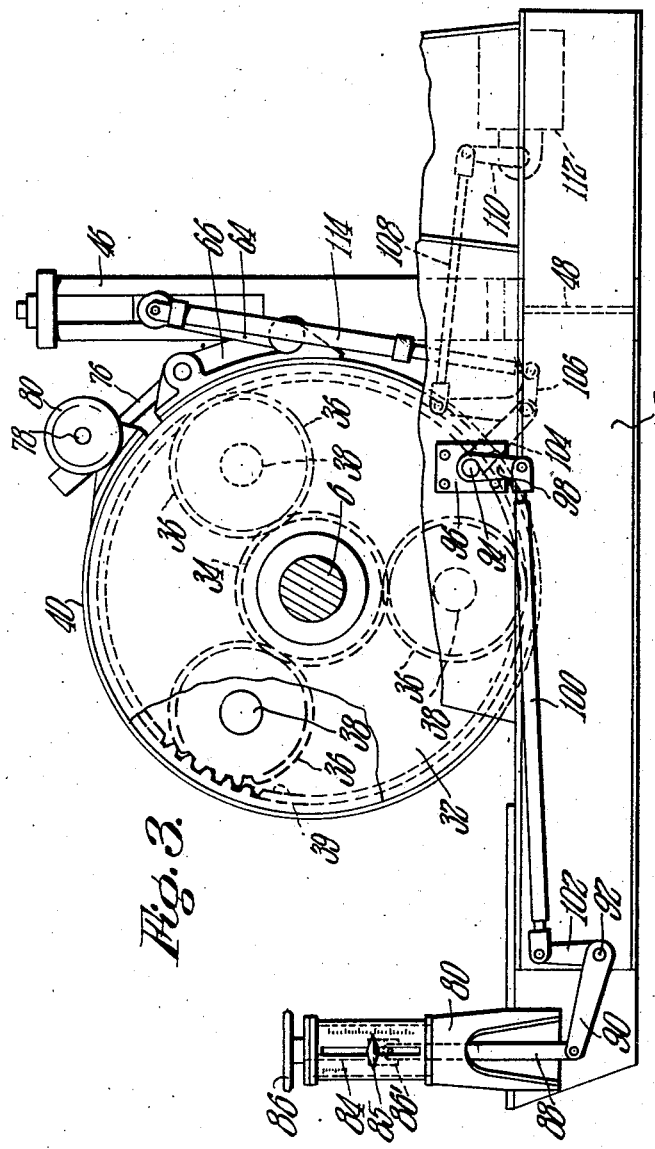
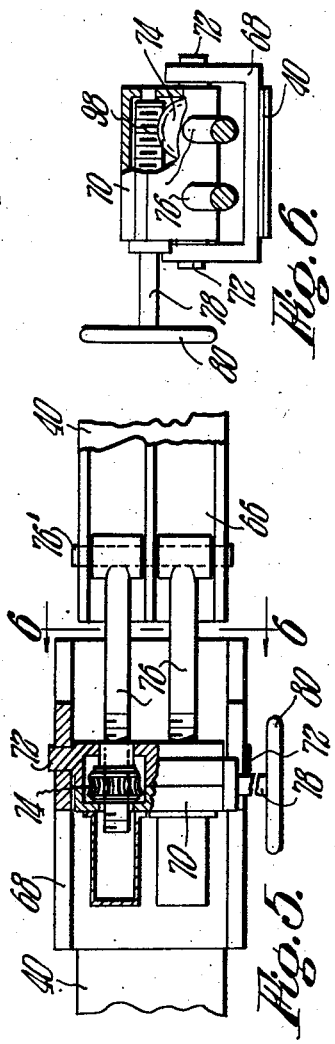
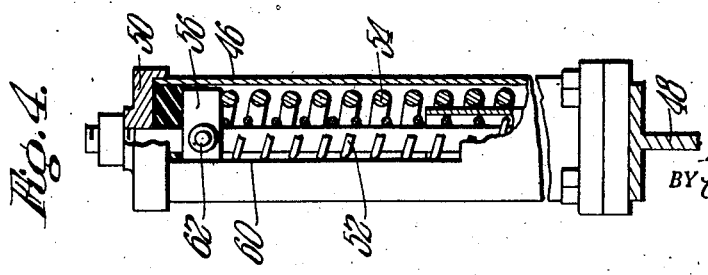
INVENTOR.
Almon A. Johnson.
BY Walter C. Ross.
Attorney.

Patented Feb. 24, 1948

2,436,752

UNITED STATES PATENT OFFICE 2,436,752

WINCH FOR TOWING AND THE LIKE

Almon A. Johnson, Forest Hills, N. Y.

Application February 17, 1945, Serial No. 578,488

2 Claims. (Cl. 254—172)

1

This invention relates to improvements in winch apparatus and is directed more particularly to winch apparatus characterized by its adaptability, among other purposes, for towing, as where one vessel is towed by another, and this application is a continuation in part of an application Ser. No. 410,121, filed by me September 9, 1941, now Patent 2,411,094 issued November 12, 1946.

The principal objects of the invention reside in the provision of winch apparatus adapted, as when towing one vessel by another, to pay out the tow-line when it is subjected to abnormal strains and to recover the payed-out line when the strain becomes normal.

Where one vessel is towed by another with a tow-line which is merely made fast to the towing vessel and extends to the towed vessel, the line is subjected to severe strains for various reasons and this oftentimes results in parting of the line.

According to this invention, the winch apparatus is constructed and arranged in such a manner that when the strain or pull on the tow-line exceeds a normal predetermined pull, as when a surge occurs, the line is payed out to accommodate the excess strain; when the strain is reduced to normal, the length of line payed out is recovered again.

It is possible to provide a predetermined length of line extending between the vessels under conditions of normal strain or pull, yet when a surge or surges occur the line is payed out to accommodate the excess pull thereby to obviate the usual consequences resulting from abnormal strains on the tow-line, and the payed-out line is recovered on normal conditions of strain to provide the predetermined length of line.

The novel objects of the invention are accomplished in a broad way by the provision of a cable drum for the tow-line which operates, as the strain or surge on the line exceeds a predetermined normal to rotate a brake drum and thereby to actuate a frictionally-engaged band which controls the function of the apparatus.

According to special features of the invention, when a surge occurs or the tension on the cable or tow-line increases over a predetermined normal so as to rotate the brake drum and band, said band operates a central component which may be a motor while means is provided to vary the tension at which the control component operates.

According to another feature of the invention, means is provided whereby the brake drum and brake band may be quickly disengaged so that

2 the drum is free to rotate for paying out cable, that is the drum under such conditions is adapted for free-wheeling to accommodate conditions which are likely to occur as where the vessel being towed is sinking.

More specific and detailed objects, advantages, and functions of the apparatus will be observed from the following description of the apparatus of the invention. Various changes and modifications may be made in the form of the apparatus without departing from the spirit and scope of the invention wherefor the form to be described is for purposes of disclosure only.

In the drawings:

Fig. 3 is a partial side elevational and sectional view longitudinally of the winch shown in Figs. 1 and 2 to explain the tension control mechanism of the winch;

Fig. 4 is a partial side elevational and sectional view of the means for resisting movements of the brake band;

Fig. 5 is a plan view of the mechanism controlling engagement of the brake drum and band; and Fig. 6 is a sectional view on the line 6—6 of Fig. 5.

Figure 1:
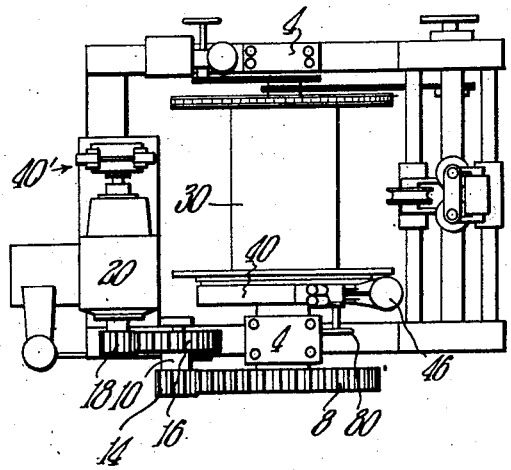
Fig. 1 is a side elevational view of a winch apparatus embodying the novel features of the invention.
Figure 2:
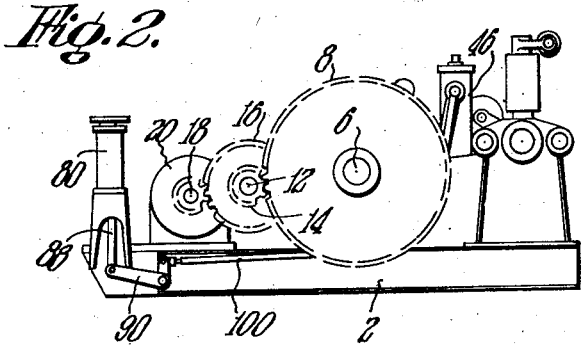
Fig. 2 is a plan view of the same.

Referring now to the drawings more in detail, the invention will be fully described. It will be understood that the construction shown is for purposes of disclosure only and that various changes in construction may be made without departing from the spirit and scope of the invention.

A supporting frame and base is represented by 2 which may be of any desired form and on which are mounted in spaced relation bearings such as 4. A shaft 6 is rotatable relative to the bearings and has a gear 8 thereon.

A bearing 10 has a shaft 12 journalled therein which has a pinion 14 fixed thereto that is in mesh with the gear 8. A gear 16 on said shaft 12 meshes with a pinion 18 of a motor 20.

A cable or tow-line drum 30 is mounted for rotation on and relative to the shaft 6 as is a brake drum 32. The cable drum and brake drum are rotatable relative to one another. A sun gear 34 is fixed to shaft 6. Planet gears 36 are journalled on studs 38 carried by the drum 30 and mesh with the sun gear 34 as well as with an internal gear 39 carried by the brake drum.

A split brake band 40 extends around the brake drum 32 and is adapted to frictionally engage or release the same.

Electrically operated brake means is represented by 40' for holding the motor against rotation and is constructed and arranged so that when energized the brake releases the motor.

Means to be described and connected to the brake band 40 yieldingly resists rotation of the said brake band and as it frictionally engages the brake band said brake drum is thereby held against rotation.

With the motor held against rotation by the brake means 40' and the brake band 40 around the brake drum so that it is yieldingly held against rotation, a strain on the cable tending to rotate the cable drum is transmitted from the drum through the planet gears and brake drum to the brake band. When the strain exceeds a predetermined normal or overcomes the yielding means resisting movements of the brake band the brake band moves to operate the motor control component and the motor brake is energized.

The means resisting movements of the brake band may take various forms but the form to be described is shown in Figs. 3 and 4.

A tubular casing 46 is secured at its lower end to a transverse member 48 of the frame structure and is closed at its upper end by a cap 50. Inner and outer springs 52 and 54 resist downward movements of a follower 56.

Slots such as 60 are provided in opposite sides of the casing and trunnions 62 extend outwardly therethrough from the follower. Links 64 are journalled at upper ends to the trunnions 62 and at their lower ends to a bracket 66 secured to one end of brake band 40.

A bracket 68 is secured to the other end of the brake band and a housing 70 has trunnions 72 journalled therein. Worm gears 74 are rotatable in the housing and are internally screw threaded to receive the threaded ends of rods 76. The opposite ends of said rods 76 are pivoted at 76' to the bracket 66.

A transverse shaft 78 is journalled in the housing and has a worm 98 fixed thereto which is in engagement with the gears 74. Said shaft 78 may be rotated by a hand wheel 80 or in any other manner desired.

As the shaft 78 is rotated in one direction or the other, the gears 74 are rotated to move the rods 76 in one direction or the other or in and out thereby to release the brake band 40 from the drum or cause the band to frictionally engage said drum.

With the brake band frictionally engaging the drum, movement thereof in a clockwise direction from the position shown in Fig. 3 is resisted by the spring means of Fig. 4.

When however the strain on the cable is sufficient to move the cable drum and through the planet gears move the brake drum and band so as to overcome the resistance of the spring means, as when a surge on the cable occurs, the brake band moves clockwise and the connection of links 66 with the follower of the spring means moves downwardly. Such a movement is utilized to operate control means for the motor in a manner and by the means to be described.

A tension control stand is shown at 80' which has a threaded shaft 84 rotatable therein provided with a hand wheel 86. A block 86' threaded on the shaft 84 has pivoted thereto the upper end of a link 88. The lower end of the link 88 is pivoted to the outer end of a lever 90 that is fixed on a shaft 92 journalled in the frame.

A shaft 94 is journalled on a bracket 96 secured to the frame and a lever 98 fixed on said shaft is connected by a connector 100 to a lever 102 fixed to said shaft 92.

A lever 104 is fixed to said shaft 94 and may be disposed inside of the frame. A bell crank 106 is pivoted to the free end of the lever 104 which has an upper arm connected by a connector 108 to a lever 110 of a control means 112 for the motor. The lower end of the bell crank 106 is connected by a spring link 114 to the journal 62 of the follower 56 of the spring means.

As the block 56 of the tension control stand is raised and lowered the pivotal connection of the bell crank 106 and lever 104 is raised and lowered through the connections described.

The spring means may be adapted to resist a certain strain on the cable so that when that strain is exceeded, as when a surge occurs, the brake band will move the follower of the spring means downwardly. A surge of greater magnitude will move the follower downwardly through a greater distance than will a surge of less magnitude.

When the pivotal connection between bell crank 106 and lever 104 is in an upper position said bell crank will be actuated for actuating the controller by a less downward movement of the follower 56 and by a surge of less magnitude than when the pivotal connection is in a lower position.

Thus the pivotal connection may be set so that the controller may be actuated by various conditions of tension on the cable. This may be accomplished by adjustment of the block 86' of the tension control which through link 88 adjusts the connections to lever 104. Indicia may be associated with the stand 80' with which an indicator 85 associated with the block 86' may register.

In this way the mechanism may be adjusted so that when the cable drum moves clockwise or in paying out direction, the controller will be operated accordingly as the cable is subjected to different tensions within a wide range of tensions. That is, the mechanism may be adjusted so that the controller will be operated whenever the tension on the cable exceeds various tensions within the range.

When it is desired to provide free wheeling of the cable drum the shaft 78 is rotated so that the rods 76 are moved away from the housing 70. This brings about releasing of the brake drum by the brake band so that the cable drum which is held by the brake drum through the planet gears is released for free rotation.

Thus it is possible to adjust the tension control mechanism so that the control means for the motor will be operated for various predetermined tensions within a wide range while the cable drum may be readily and easily released for free wheeling to pay out cable.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A towing winch apparatus comprising in combination, a support, a main shaft rotatable therein, a motor operatively connected to said shaft, a controller for connecting to said motor, a relatively rotatable cable drum and a brake drum independently rotatable on and relative to said shaft, a sun gear fixed on said shaft in engagement with planet gears rotatable on said cable drum and a gear on said brake drum in engagement with said planet gears whereby a strain on a cable around said cable drum tends to rotate said drum in pay-out direction and through said gears to rotate the brake drum in one direction, a brake band adapted to releasably and frictionally engage and to be rotated in said one direction when engaging said brake drum, yielding means offering resistance to rotation of said brake band in said one direction arranged and adapted whereby said brake band will rotate through certain arcs according to certain strains on the cable, operative connections extending from said brake band to said controller including a movable support having a bell crank pivoted thereto with links connecting said bell crank and said brake band and controller respectively and means for moving said movable member whereby said movable member may be positioned so that said controller may be actuated by various predetermined arcs of rotation of said brake band.

2. A towing winch apparatus comprising in combination, a support, a main shaft rotatable therein, a motor operatively connected to said shaft, a controller for connecting to said motor, a relatively rotatable cable drum and a brake drum independently rotatable on and relative to said shaft, a sun gear fixed on said shaft in engagement with planet gears rotatable on said cable drum and a gear on said brake drum in engagement with said planet gears whereby a strain on a cable around said cable drum tends to rotate said drum in pay out direction and through said gears to rotate the brake drum in one direction, a brake band adapted to releasably and frictionally engage and to be rotated in said one direction when engaging said brake drum, yielding means offering resistance to rotation of said brake band in said one direction arranged and adapted whereby said brake band will rotate through certain arcs according to certain strains on the cable, a lever pivoted to said support, a bell crank pivoted on a free end of said lever, links connected at outer ends to said brake band and to said controller and at inner ends at spaced points to said bell crank, and means to move said lever to vary the position of the pivotal connection of the bell crank and lever thereby to obtain actuation of the controller on various arcs of rotation of said brake band.

ALMON A. JOHNSON.

REFERENCES CITED

The following references are of record in the file of this patent:

UNITED STATES PATENTS

| Number | Name | Date |
| --- | --- | --- |
| 1,946,145 | Johnson | Feb. 6, 1934 |
| 2,352,309 | Benson | June 27, 1944 |